UNITED STATES PATENT OFFICE 2,190,921

ESTERS OF OCTYL ALCOHOL WITH LOWER MOLECULAR WEIGHT SULPHO CARBOXYLIC ACIDS

Benjamin R. Harris, Chicago, Ill., assignor to The Emulsol Corporation, Chicago, Ill., a corporation of Illinois No Drawing. Application July 30, 1932, Serial No. 627,096. Renewed September 24, 1938

3 Claims. (Cl. 260—481)

My invention relates to a new class of chemical substances, and more in particular to a new class of chemical substances particularly adapted for use as detergents, wetting, penetrating, lathering, flotation and anti-spattering agents and for frothing purposes.

In certain classes of industries, there is a need for a certain class of chemical substances usually used in relatively small quantities but capable of use in larger quantities to secure an effect principally the result of a wetting action such as at a water oil interface. In the textile and dyeing industries, for example, there are many situations where a wetting or detergent action is imperative and many different chemical substances have been produced calculated to reduce surface tension and promote wetting in these industries. The use of prior art substances has not been attended with unqualified success in all instances. In certain other types of industries, such as the margarine industries, for example, problems in preventing the spattering of margarine in frying have arisen. These problems are considered by some investigators as entirely a matter of wetting; in other words, by promoting greater attraction between the oleaginous and aqueous portions of the emulsion at the interfaces thereof. Although the problem is probably not one of wetting action entirely, it appears that certain compounds which in theory tend to concentrate at the water oil interface will have an effect upon the spattering behavior of margarine. This problem is discussed and a remedy disclosed in my co-pending application, Serial No. 566,156, filed September 30, 1931, now Patent No. 1,917,256, as a continuation in part of a prior application, Serial No. 475,622, now Patent No. 1,917,250.

The principal object of my present invention is the provision of a new class of chemical substances capable of satisfactory use in connection with the problems hereinabove discussed.

Another object is the provision of a new class of chemical substances which are in general of relatively simple structure and can be cheaply made in commercial quantities.

Another object is the provision of a class of chemical substances of the character set forth which in the main will be innocuous and non-toxic, even though employed in such foods as margarine.

Another object is the provision of a new class of chemical substances having improved wetting characteristics.

Other objects and features of the invention will be apparent from a consideration of the following detailed description.

The substances of my invention are in general ester derivatives of lower molecular weight fatty acids with at least one unesterified sulphonic acid group in the fatty acid radical wherein the group esterified with the fatty acid has a lipophile radical with at least four carbon atoms. In certain circumstances there may be more than one unesterified sulphonic acid group in the fatty acid radical or there may be sulphonic acid groups that are esterified and other sulphonic acid groups that are not esterified, but in all cases there must be at least one unesterified sulphonic acid group in the fatty acid radical. The fatty acid radical with the free sulphonic acid group is of relatively low molecular weight.

Considering the compounds from another aspect, the molecule in each instance contains a relatively high molecular weight lipophile group and a relatively low molecular weight hydrophile group which, in the class of compounds to which my present invention relates, are sulphonic acid radicals. From still another angle, the compounds may be considered as combinations of a higher molecular weight lipophile group and a relatively low molecular weight sulpho-fatty acid group. A more complete understanding of what may comprise the lipophile group and the particular character of the sulpho-fatty acid group will be had as the detailed description progresses.

The function of the sulphonic acid group is to impart hydrophyllic properties, that is, water wetting or water attracting properties, to the molecule as a whole. The groups which are esterified by the sulphonic fatty acid are in general of a lipophile character. At times they may be strongly lipophillic and at other times moderately lipophillic. They may be of low molecular weight or of moderately high molecular weight, depending upon the purpose for which the substances may be used. Furthermore, a group or groups which are esterified by the sulphonic fatty acid may have hydrophyllic radicals of their own. An example of this type of substance is monostearyl glycerol sulphoacetate, sodium salt.

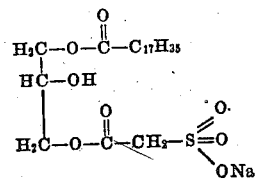

It is evident that in the substance represented above, the group which is esterified by the sulphoacetic acid happens to have a hydrophyllic radical of its own, namely the unesterified hydroxy radical in the glycerol residue.

The lipophile groups entering into the molecular structure of my substances may be of simple character, as for example in cetyl sulphoacetate, or they may be of a more complex character as indicated by the substance, the structural formula of which is written directly below.

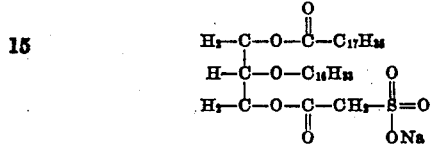

Some additional examples of members of the group of substances which I have discovered are as follows:

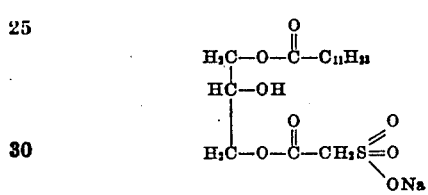

Monolauryl glycerol sulpho-acetate (sodium salt)

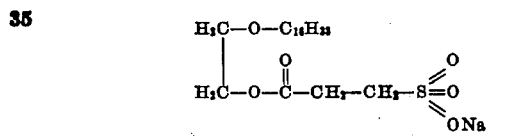

Cetyl ethyleneglycol sulpho-propionate (sodium salt)

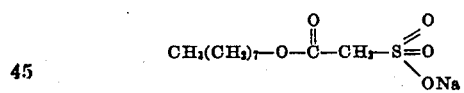

Octyl sulphoacetate (sodium salt)

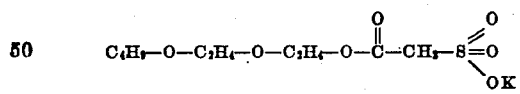

Butyl diethyleneglycol sulphoacetate (potassium salt)

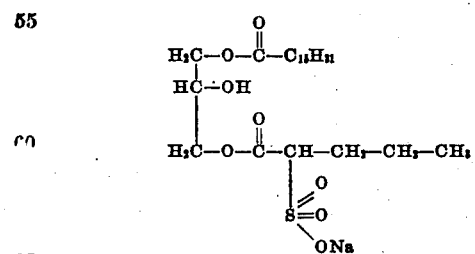

Monopalmityl glycerol sulpho-valerate (sodium salt)

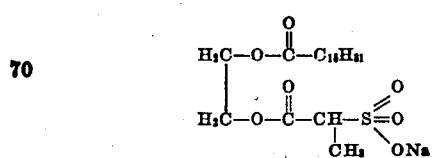

Monopalmityl ethyleneglycol sulphopropionate (sodium salt)

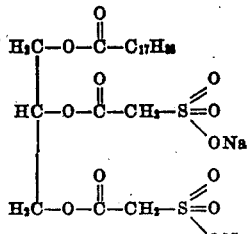

Monooleyl disulphoacetyl glycerol (disodium salt)

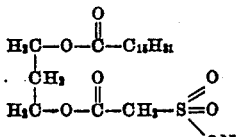

Palmityl tri-methylene glycol sulpho-acetate (sodium salt)

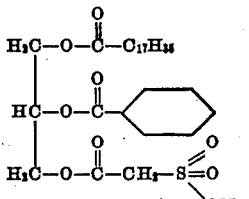

α-stearyl, β-benzoyl, α' sulphoacetyl glycerol (sodium salt)

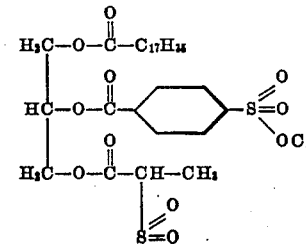

α-stearyl, β-(p-sulphethoxy) benzoyl, α'-sulphopropionyl glycerol

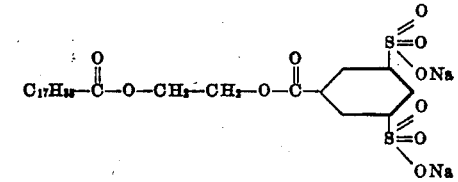

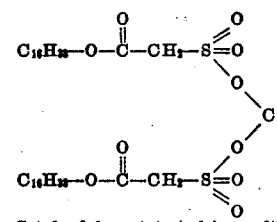

Cetyl sulphoacetate (calcium salt)

Generally speaking, I may select many different types of compounds as lipophile groups, principally compounds having lipophile radicals of relatively high molecular weight. For example, the following materials may be utilized as sources of lipophile groups: melissic acid, stearic acid, oleic acid, lauric acid, palmitic acid, lauryl alcohol, cholesterol, monostearyl glycerine (monostearine, so called), many higher molecular weight esters with esterifiable hydroxy groups and other substances with marked affinity for oils and fats.

From a study of the compounds which I list hereinabove, those skilled in the art will understand that I may use many different expedients for forming the compounds insofar as the dominant lipophile group and the relatively low molecular weight sulpho-fatty acid group are concerned. In general, however, ester or ether linkages are utilized between these two portions of the compound, and the skilled chemist will understand in general the most approved practices in securing this result. Numerous methods are also available for the introduction of the sulphonic acid group. In the case of aromatic sulphonic acids, of course, standard sulphonation procedures employed for producing aromatic sulphonic acids may be used, and, if desired, the lipophile group may be introduced subsequently.

In the case of aliphatic sulphonic acids, and for that matter, even for the production of aromatic sulphonic acids, a reactive halogen may be caused to react with sodium sulphite or potassium sulphite or ammonium sulphite or some other sulphite in aqueous solution, if desired.

Another method is to introduce a sulph-hydryl or disulphide or some other suitable sulphur containing group and then oxidize to the sulphonic acid with nitric acid or a permanganate or some other oxidizing agent.

As an example of one of these methods, I describe herewith the preparation of the sodium salt of cholesteryl sulphoacetate; nine parts of cholesterol, nine parts of brom acetyl bromide, and forty parts of benzene were heated under a reflux condenser for two hours at the boiling point of the mixture. The reaction mixture was then washed repeatedly with hot water until it was substantially free of acid and free of benzene by distilling from a steam bath. Seven parts of this reaction product were then treated with seven parts of sodium sulphite ($Na_2SO_3$), dissolved in forty parts of hot water, for five hours at the temperature of boiling water and with continuous, vigorous agitation. This reaction mixture was washed several times with hot brine until free of sulphites, dried and finally purified by extracting the impurities with dry ethyl ether. Analysis showed that the product was the sodium salt of cholesteryl sulphoacetate in relatively pure form, with an admixture of sodium chloride.

Those skilled in the art are referred to my co-pending application, Serial No. 566,160, filed September 30, 1931, now Patent No. 1,917,260, in which I disclose the use of some of the compounds of my present invention as anti-spattering agents for use in margarine. In this co-pending application I also treat of the manner of making some of these compounds.

Those of my substances which are freely soluble in water may be recovered from their solutions and from their water solutions in the customary manner by concentrating and crystallizing. As stated hereinabove, as the mass of the lipophile radical increases, solubility decreases and affinity for water is manifested by the dispersibility in water. From these aqueous dispersions, my substances may be readily recovered by "salting out" with suitable soluble electrolytes. Common salt is very satisfactory for this purpose in most cases. When salted out of an aqueous dispersion at temperatures ranging from 60 to 95° C., the substances are obtained in the form of a paste with a water content ranging from approximately 25 to 75%. The more hydrophyllic the substance, the greater the water content, and, of course, the salt is present in the water of the paste in approximately the same concentration in which it existed in the dispersion from which the paste was salted out.

Most of the compounds of my invention, although in many respects differing from each other in accordance with the numerous examples given, nevertheless may be represented by the structural formula

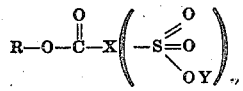

wherein R is a lipophile group, X is the carbon-hydrogen residue of the sulpho-fatty acid, Y is a cation and $w$ is a small whole number, at least one.

I have previously referred to the fact that the lipophile group may in itself contain hydrophile radicals, as, for example, in the case of monostearyl glycerol sulphoacetate, the hydroxy radical of the second glycerine carbon has a recognized hydrophyllic character. The group as a whole, however, of which this hydroxy radical is a part, is dominantly lipophile, the single hydroxy radical in such a compound being insufficient to impart dominant hydrophile characteristics to the group as a whole. Moreover, in the case of a compound having an esterified sulphonic acid group, this sulphonic acid group will usually be found to possess a lipophile character or at least will not have a marked hydrophile character due to the additional group or radical which has been attached to the sulphonic acid group by esterification. When the character "R" is used in the formula, therefore, to represent a lipophile group, it is with the assumption that the group as a whole will not possess a hydrophyllic character.

Considering more specifically the character of the lipophile group, it will at once be apparent that for the most part I employ derivatives of glycerols or glycols, although the lipophile group may comprise a straight chain higher molecular weight fatty acid group suitably attached to the sulpho-fatty acid of relatively low molecular weight. Insofar as the sulpho-fatty acid group is concerned, I may employ a sulphoacetate, sulpho butyrate, or other similar groups containing an unesterified sulphonic acid radical. In general, however, I have found that the sulphoacetates particularly produce compounds of exceptionally valuable characteristics and they have the advantage of being relatively inexpensively produced from commercially available substances.

The term "sulpho-fatty acid", as employed throughout the specification and claims, is used in a strictly rigorous sense to mean an aliphatic compound containing a sulphonic acid group. In other words, there is a direct carbon to sulphur linkage.

My present application is a continuation-in-part of my co-pending application, Serial No. 481,349, filed September 11, 1930, now Patent No. 1,917,255. Said co-pending application Serial No. 481,349 was a continuation in part of my prior application Serial No. 475,622, filed August 15, 1930, now Patent No. 1,917,250.

What I claim is new and desire to protect by Letters Patent of the United States is:

1. Octyl sulphoacetate.
2. An ester of a sulpho-carboxylic acid having from two to four carbon atoms with octyl alcohol.
3. An ester of octyl alcohol with a lower molecular weight sulpho-carboxylic acid, a sulphonic group of said lower molecular weight sulpho-carboxylic acid radical being attached to the same carbon atom to which a carboxyl group of said lower molecular weight sulpho-carboxylic acid is connected.

BENJAMIN R. HARRIS.